United States Patent [19]

Hagen

[11] 4,080,686
[45] Mar. 28, 1978

[54] STRUCTURAL SUPPORT MOUNTING MEANS FOR PRECISION, TELESCOPING, LINEAR SLIDE MECHANISMS

[76] Inventor: Magnus F. Hagen, 434 Panorama Dr., Laguna Beach, Calif. 92651

[21] Appl. No.: 685,637

[22] Filed: May 12, 1976

[51] Int. Cl.² ............................................. E05D 13/02
[52] U.S. Cl. ............................................. 16/88; 49/409; 49/425
[58] Field of Search .................. 16/87 R, 87.2, 87.4 R, 16/87.6 R, 87.8, 88, 98; 160/19, 346, 347; 49/409, 425

[56] References Cited

U.S. PATENT DOCUMENTS 3,392,420 7/1968 Kless ............................. 16/87.6 R Primary Examiner—Werner H. Schroeder
Assistant Examiner—Moshe I. Cohen
Attorney, Agent, or Firm—J. C. Baisch

[57] ABSTRACT

A structural support mounting means for precision, telescoping, linear slide mechanisms of the type having an outer slide member and an inner slide member, each being held in sliding relationship by ball bearings or the like, the balls being operably disposed in a ball retainer between the inner and outer slide members. The structural support mounting means is defined by an elongated rail having oppositely disposed channels formed longitudinally therein, to structurally support and receive a pair of oppositely arranged slide mechanisms, wherein each adjacent slide member is affixed to a central, load-carrying bracket for longitudinal movement of the load secured to the bracket thereof, and wherein an elongated, structural-reinforcing bar member is adapted to be received and fixedly mounted within the inner slide member. Both the rail and the reinforcing bar members are formed from an extruded aluminum material whereby structural strength, load-carrying capacity, and extended, load-carrying capacity are established with respect to the outer and inner slide members.

10 Claims, 5 Drawing Figures

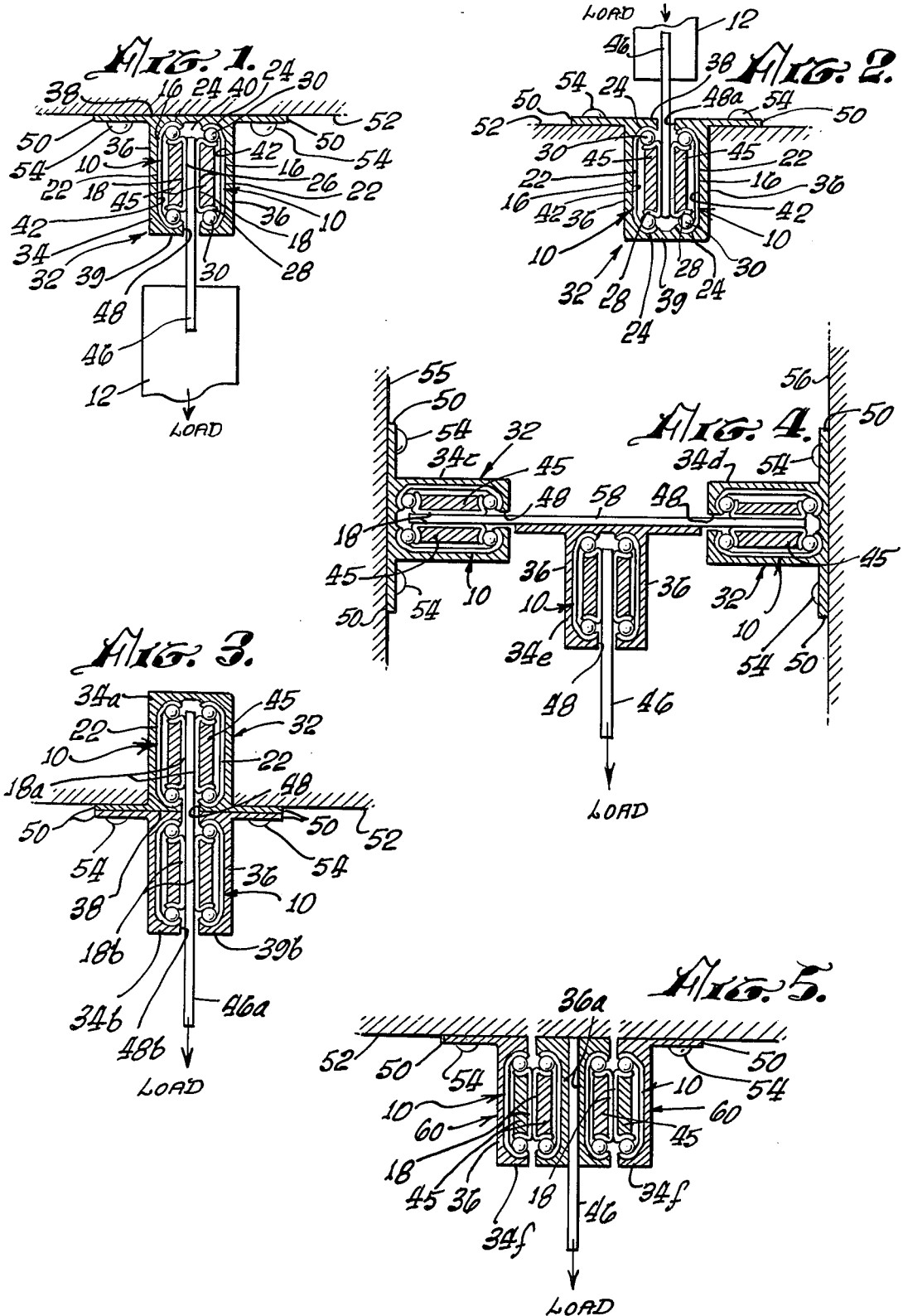

STRUCTURAL SUPPORT MOUNTING MEANS FOR PRECISION, TELESCOPING, LINEAR SLIDE MECHANISMS

BACKGROUND OF THE INVENTION

1. Field of the Invention

This invention relates generally to telescoping, linear slide mechanisms, or linear motion ball bearing mechanisms or "solid bearing mechanisms, or roller bearing mechanisms", and relates more particularly to a structural support mounting means in combination with such slide mechanisms, whereby the load-carrying capabilities of the length of the mechanisms, the shock and vibration resistance, the mounting means, and the uses thereof are sufficiently increased over the prior art thereof.

2. Description of the Prior Art

There are many types of sliding mechanisms which are presently available and are well known. However, various problems and difficulties are encountered in providing the necessary structural strength and load-carrying capacity required in many areas of construction.

It has been found that the most efficient, low-cost, sliding mechanisms are of the type known as the linear or telescoping, ball-bearing, slide units. These units are generally associated with the applications such as electronic packaging, copying machines, door movements, appliances, products made of metal, wood, plastics or other materials.

However, in the applications of heavy loads, such as hanging doors, partitions and like structures or long length slide requirements, the slides, because of their inherent operating design, are not totally capable of successfully providing exceptional working capabilities as heretofore known.

Thus, some have tried to strengthen the structure of the slide members, making them from heavier materials—which only added to the weight, overall size and cost, with the additional over accumulation of tolerances accruing in such structure assemblies.

Further, designs have been tried wherein the structural material is made from aluminum-type alloys. Again, this was found not to be satisfactory in operation because of the wear created by steel ball bearings, rollers or solid bearing sections in their respective recesses. These steel balls, rollers and the like gall into the softer aluminum races and/or Brinell into the ball races, thereby eventually making the slide unusable.

It also should be noted that, in order to negate some of the wear factor characteristics of an aluminum, extruded, ball-bearing slide, a thin strip of steel has been inserted into the extrusion for ball race purposes, to provide longer wear characteristics, etc., as well as resistance to shock, wear and vibration Brinelling.

However, it has been recognized that, by inserting these thin strips of steel into the softer extrusion, the steel strip itself is subjected to loosening when the ball bearings or the like traverse back and forth thereover.

Thus, there is a need for a change in slide mechanisms, whereby the use thereof relating to heavy-load wear is not sufficiently affected in its long-operating life span.

SUMMARY OF THE INVENTION

The present invention relates to a structural support mounting means to be used in conjunction with precision, telescoping, linear slide mechanisms which are generally made of steel or stainless-steel, plastic, or aluminum stamped or otherwise made to form outer and inner slide members. As is well known, each slide member is provided with bearing raceways formed along the longitudinal leading edges thereof, wherein the associated ball bearings or the like are operably interdisposed between the opposing raceways of each slide member, and hold the members in sliding relationship to each other.

Generally, when the mechanism is installed, one of the slide members is secured in a relatively stationary manner while the other adjacent slide member is allowed to slidably move with respect thereto. Usually, the outer slide member is attached to a stationary structure or member, while the inner member is secured to a movable member and, in this particular situation, the movable member can be any slidable member such as a hanging door, partition or like structure. Thus, the inner member, along with its attached structure, is capable of sliding relative to the outer stationary member and structure.

In the case where the hanging structure comprises considerable weight, there is created a problem of protecting the slide members from collapsing. That is, any distortion of the slide members creates an inoperative device.

Accordingly, the above problems and others heretofore mentioned have been overcome by the combination of such a ball-bearing slide or a like mechanism with a structural support mounting means which comprises an elongated rail unit extruded from an aluminum alloy steel, plastic or other material, the rail unit being defined by a tubular slide housing, wherein at least one side thereof is provided with a longitudinal slot which communicates along the entire length of the defined barrel, the barrel being formed from a pair of oppositely disposed, channel-like cradles wherein the outer slide member is fixedly received and supported therein. It is to be understood that the rail is affixed to a stationary structure by any well known fastening means.

Thus, the rail unit is adapted to cradle and support a pair of opposing slide mechanisms. The position of each outer slide in each cradle will, therefore, position each respective inner slide member in a side-by-side relationship, wherein the inner slides are connected together by a mounting bracket which is provided to carry a load, that being a hanging door, a partition, or the like structure.

Again, a rigid inner slide member must be maintained. Thus, a reinforcing bar member, also an aluminum extrusion, is provided to be received within the channel-like configuration of each inner slide member. However, it may not always be necessary to reinforce the inner slide member or vice-versa.

With each outer slide member being firmly secured within the rail unit, the alignment of each outer slide is held from any distortion; and, in the same manner, the reinforcing bar establishes a firm, unyielding, inner slide. Hence, no misalignment can occur between the respective slide members and the ball bearings, or like means, thereby giving load-carrying capabilities heretofore not possible.

OBJECTS AND ADVANTAGES OF THE INVENTION

The present invention has for an important object a provision whereby known precision-type, telescoping, or linear slide mechanisms, are capable of being employed in the capacity of an extended load-carrying device capable of smooth operation and having such heavy loads as electronic compartments, hanging doors, partitions, and the like structures, attached thereto.

It is another object of the invention to provide a structural mounting for precision, telescoping, linear slide mechanisms wherein the slide mechanisms are held in such a manner that the slide members thereof are prevented from being misaligned by the applied weights thereto, wherein there is still the longlife expectancy that is generally associated with slide units, and wherein the normal life expectancy is extended even further due to the rigid control characteristics thereof.

It is still another object of the invention to provide a structural mounting for precision, telescoping, linear slide mechanisms wherein the mounting includes a sound-deadening quality which can diminish, or even eliminate, the hollow sound created by rolling balls in a sheet-metal box, as will sometimes occur in certain installations.

It is a further object of the present invention to provide a device of this character that can be used either to support a structural load in a hanging position or support a load positioned above the slides, or a load positioned on the sides of the slides.

A still further object of the present invention is to provide a device of this character that is capable of structurally supporting heavy loads, wherein the device will allow an extremely thin profile—whereas normally a much heavier and wider arrangement is necessary to accomplish the same.

It is still another object of this invention to provide a device of this character that can be simply extruded to the desired shape; and wherein the lengths thereof are easily determined to accommodate a plurality of end-to-end slide members therein.

A further object of this invention is to provide a device of this character that is so designed having a shape closely encompassing the inserted shorter slide member's cross-sectional, shape so that the inserted plurality of end-to-end slide members do not have to be mechanically connected at their respective mating ends.

Still a further object of the present invention is to provide a device of this character that overcomes problems of mounting slides to surfaces of similar or dissimilar materials, such as causing otherwise electrolytic damaging affects thereto.

It is a further object of the invention to provide a device of this character that is easy to install, service, and maintain.

It is still another object of this invention to provide a device of this character that is relatively inexpensive to manufacture.

Other characteristics, advantages and objects of this invention can be more readily be appreciated from the following description and appended claims. When taken in conjunction with the accompanying drawings, this description forms a part of the specification wherein like references and characters designate corresponding parts in several views.

DESCRIPTION OF THE DRAWINGS

Referring to the drawings, which are for illustrative purposes only:

FIG. 1 is a transverse, cross-sectional view of the present invention having a pair of slide units mounted therein, wherein the load is supported below the structure;

FIG. 2 is a similar cross-sectional view wherein the support structure and mounting bracket are inversely positioned with respect to that shown in FIG. 1, wherein the load is carried and supported above the sliding structure;

FIG. 3 is a transverse, cross-sectional view of an alternative arrangement wherein a pair of support structures are mounted, one above the other, in a cooperating position having the mounting bracket secured to each pair of respective slide mechanisms;

FIG. 4 is a transverse, cross-sectional view of another alternative arrangement of a tri-supported structure; and FIG. 5 is a cross-sectional view of still another arrangement of the present invention wherein a pair of structural support mounting means are juxtapositioned in a side-by-side relationship wherein the mounting bracket is secured to portions of the rail member thereof.

DESCRIPTION OF THE PREFERRED EMBODIMENT

Referring more particularly to the drawings, there is shown in FIG. 1, a slide mechanism, indicated generally at 10, said slide mechanism being of the type known in the art as a precision, linear ball-bearing slide, which up until the present time has been generally associated with the movement of lighter objects, such as drawers of wood and metal furniture, file cabinets desks, cabinets, appliances or electronic packages, and the like. However, when said slide mechanism is incorporated and operates in conjunction with the present invention, as will hereinafter be described, it will become evident that said precision, ball-bearing slides can be readily adapted for use with heavy structural members, such as hanging doors, partitions, heavy computer type compartments, and the like, generally designated at 12.

As is well known in this type of ball-bearing, slide mechanism, there is included a pair of slide members, one being represented as an outer member 16 and the other as an inner member 18, wherein generally one slide member thereof is secured to a substantially stationary structure, while the other slide member is attached or secured to the movable object or structure.

Slide members 16 and 18 are generally channel-shaped and formed of sheet metal—preferably steel—by stamping, forming or the like, these parts being made with great accuracy.

Outer member 16 has a longitudinally extending, center wall 22 which may be termed the bottom of a defined channel, wherein each longitudinal side edge thereof forms a raceway 24, which extends laterally and outwardly therefrom, having a substantially concave and convex cross section, with the concave surface facing inwardly so that said surfaces are oppositely arranged relative to the length of the wall 22.

Inner slide member 18 is also provided with a bottom wall, indicated at 26, having longitudinally extending sides, or side edges, which form laterally turned ball raceways 28, said raceways being oppositely arranged and arcuate in cross-section, with the concave surfaces positioned oppositely to respective adjacent raceways 24 of the outer slide member, said raceways 24 being spaced from said adjacent raceways 28.

Interdisposed between raceways 24 and 28 are a plurality of ball bearings 30 which allow free movement between each slide member. Various other types of arrangements are known, such as providing ball-bearing retainers. However, this is not herein shown.

Thus, it can be understood that a slide mechanism as heretofore described is so made as to be very accurate in its structural arrangements and alignments. Therefore, any undue stress or strain placed upon either or both slide members could possibly cause a misalignment to occur therebetween, wherein the slide becomes inoperable. Hence, the present invention not only provides a means of supporting said slide mechanism, but in addition provides a simple means whereby each inner slide member 18 is held in a rigid, non-flexing, parallel relationship to the other, without causing a binding action to occur. Thus, a heavy structural load attached to and operated with the slide mechanism will not affect the straight alignment tolerances necessary for a free-rolling operation.

As previously mentioned, the above unique, stable operation of the ball-bearing type slides is accomplished by incorporating said slides with the present invention, which provides for a structural support mounting means, indicated generally at 32.

Said structural support mounting means 32 comprises an elongated rail unit extruded from an aluminum alloy having a substantially box-like, transverse cross-section which is defined by a tubular slide housing 34, the housing having side vertical walls 36 and end walls 38 and 39, respectively, wherein a barrel 40 is defined thereby and includes a pair of oppositely formed, channel-like cradles 42, said cradles having substantially the same configuration of the outer slide member 16 which is readily received and supported therein, as illustrated in the drawing. It should be understood that each outer slide member can be force-fitted in the cradle 42 or be provided with a hole to receive a screw therethrough. The walls 34 can be readily provided with tapped holes to threadably receive the screws. The holes and screws are not shown, as this does not constitute part of the inventive novelty; hence, any suitable means for securing the slides in the cradles may be used.

In order to provide a stable—yet substantially rigid—inner slide member 18, there is included a reinforcing bar member 45 designed to be readily but forceably positioned within the channel area of the inner slide member 18.

Accordingly, it should be noted that, due to the particular adjacent arrangement of each slide mechanism 10, the respective inner slides face each other, thereby allowing a load-mounting means, indicated at 46 and represented as a mounting bracket, to be secured to each juxtapositioned wall 26 of the inner slides 18. However, this requires that a longitudinal slot 48 be formed in at least one end wall of the tubular housing, whereby the outwardly extended mounting bracket 46 can freely move with the slide members, and be arranged to have various loads attached thereto.

FIG. 1 illustrates the bracket 46 as extending downwardly and having load 12 attached thereto in a hanging manner; and wherein the rail 32 includes its own mounting leg members indicated at 50, being laterally extended and integrally formed as part of the rail. These mounting legs are secured to the stationary structure 52 in any well-known, suitable manner, such as screws 54.

Referring to FIG. 2, there is shown a similar device as previously described wherein the rail housing is employed in a supporting manner. That is, the load 12 in this particular arrangement is being supported and carried above the rail, rather than hanging below as illustrated in FIG. 1. To accomplish this arrangement, the upper end wall 38 is provided with a longitudinal slot 48a and the lower end wall is completely closed. Thus, the mounting bracket 46 extends upwardly from the slide members 18 and provides a slidable mounting means whereby load 12 is carried thereby. In this arrangement, the mounting legs 50 are secured to said stationary structure 52 in a different manner, as indicated in FIG. 1.

Referring to FIG. 3, there is shown a third arrangement of the present invention wherein a dual rail device is used. Such a unit as herein shown would provide additional applications where very heavy loads are required to be moved. Accordingly, this unit includes a first rail unit 34a and its associated slide mechanism 10 positioned above and in alignment with a second lower rail unit 34b having its own slide mechanism 10, as previously described. This particular structural support means comprises the first rail unit 34a which is attached to the second unit in a face-to-face relationship, wherein the units are secured in an inverted manner having their respective mounting legs abutting each other so as to be mounted together to the fixed structure 52. The adjacent, abutting, end walls 38 are each provided with slots 48 whereby an elongated mounting bracket 46a extends therethrough, said bracket 46a being secured to the inner slide members 18a disposed in the first rail unit 34a and to the inner slide members 18b of the second rail unit 34b. Said bracket 46a projects from the second rail unit 34b through slot 48b disposed in end wall 39b.

It should be mentioned at this time that the device as shown in FIG. 3 is also designed so that it can be positioned similarly to that in FIG. 2. That is, this unit is capable of supporting a hanging structure as illustrated in FIG. 1, or it can be used to carry a load as shown in FIG. 2.

FIG. 4 illustrates a further arrangement which would be referred to as a "tri-support system". This arrangement comprises at least three rail units 34c, 34d and 34e, wherein each unit includes, as before, its own respective slide members. In this embodiment, rail units 34c and 34d are affixed to oppositely disposed, vertical structures 55 and 56, respectively. Rail units 34c and 34d are positioned in a horizontal manner whereby their respective slots are in parallel alignment with each other. This alignment allows the slide mechanisms 10 in rails 34c and 34d to be operably joined by a carriage plate 58, said plate 58 thereby extending from one unit to the other and slidably moving in unison therewith.

Included herein is the third rail unit 34e which is fixedly secured to the carriage plate 58. This unit is the one which is described in FIG. 1 and has a depending, mounting bracket 46. Thus, it can be seen that, with a rail unit using the basic components herein described, a building-block system of various arrangements can be formed to provide the needed strength, load-carrying and extended load-carrying capabilities for each particular situation that would arise.

To further illustrate the building-block system, FIG. 5 shows a pair of rail units, indicated at 60, positioned in a parallel, side-by-side arrangement wherein the inner slide members 18 are secured together as a single component, each being provided with its respective reinforcing bars 45. It is to be noted that, in this arrangement, the load-carrying bracket 46 is secured to the inner side walls 36a of the housing 34f. However, said inner side walls 36a are not directly attached to side walls 36, as is the case in the previously mentioned devices. In this application, the inner walls 36a move with the sliding members when the load is moved.

It should also be noted that extrusions of the structural support mounting means can be made in any lengths. Thus, a plurality of slide units can be inserted in an end-to-end relationship forming a very long and continuous structure, providing functional slide lengths that has not been possible heretofore.

The invention and its attendant advantages will be understood from the foregoing description, and it will be apparent that various changes may be made in the form, construction and arrangement of the parts of the invention without departing from the spirit and scope thereof, or sacrificing its material advantages, the arrangements hereinbefore described being merely by way of example, and I do not wish to be restricted to the specific forms shown or uses mentioned, except as defined in the accompanying claims.

I claim:

1. A structural support mounting means in combination with precision, telescoping, linear, ball-bearing slide mechanisms having inner and outer slide members and ball bearings disposed therebetween, wherein the improvement comprises:
    an elongated rail housing having side and end walls defining a longitudinal barrel therein, wherein at least one end wall thereof is provided with a longitudinal slot communicating with said barrel;
    a pair of support cradles disposed in said barrel and formed in each of said side walls, wherein a slide mechanism is fixedly retained in each oppositely disposed cradle;
    a pair of inner slide members, each having a longitudinally extending bottom wall and oppositely facing ball raceways along the side edges thereof;
    a reinforcing bar member formed to be received and mounted within said inner slide member;
    a mounting bracket for attaching a load thereto, said bracket being arranged to move with said slide mechansim; and
    means for attaching said rail housing to a substantially fixed structure.

2. A structural support mounting means as recited in claim 2, wherein said mounting bracket is secured directly to each adjacent inner slide member, whereby said bracket slidably moves in said slot with the movement of said inner slide members.

3. A structural support mounting means as recited in claim 2, wherein said means for attaching said rail housing comprises a pair of oppositely disposed leg members integrally formed with said rail housing.

4. A structural support mounting means as recited in claim 3, wherein said rail housing includes an upper end wall and a lower end wall, and wherein said elongated slot is disposed in said lower end wall, allowing said mounting bracket to extend downwardly and outwardly therefrom, whereby a load can be supported in a hanging mode below said rail housing.

5. A structural support mounting means as recited in claim 3, wherein said rail housing includes an upper end wall and a lower end wall, and wherein said elongated slot is disposed in said upper end wall, allowing said mounting bracket to extend upwardly and outwardly therefrom, whereby a load can be supported in a carrying mode above said rail housing.

6. A structural support mounting means as recited in claim 2, including a second rail housing secured to said first mentioned rail housing, said second rail housing being located below said first rail housing and being provided with parallel slots disposed in each end wall thereof, said mounting bracket being secured to said inner slide members of both slide mechanisms disposed in each rail housing, extending outwardly from said second rail housing through said slots thereof.

7. A structural support mounting means as recited in claim 2, including:
    a second and a third rail housing, each having at least one elongated slot disposed therein, wherein said first mentioned rail housing and said second rail housing are oppositely disposed to each other, having respective slots thereof facing inwardly in parallel alignment; and
    a carriage plate slidably supported within said first and second housings, said plate being affixed to each pair of inner slide members for longitudinal movement therewith, wherein said third rail housing is mounted to said carriage plate to move therewith, said mounting bracket being secured to said inner walls of said slide mechanisms disposed in said third rail housing.

8. A structural support mounting means as recited in claim 1, wherein said side walls are independent of each other, and at least one side wall thereof being arranged to be moved relative to the other side wall thereof; and wherein said mounting bracket is secured to said movable side wall.

9. A structural support mounting means as recited in claim 8, wherein a second rail housing is positioned in adjacent, parallel relationship to the first rail housing, wherein each rail housing has respective, movable side walls in a juxtaposed arrangement, whereby said mounting bracket is secured to each movable side wall.

10. A structural support mounting means for precision, telescoping or linear, ball-bearing, slide mechanisms comprising:
    an outer slide member of generally channel-shaped configuration, and having a longitudinally extending bottom wall and oppositely arranged ball raceways along the side edges of the bottom wall;
    an inner channel-shaped slide member having a longitudinally extending bottom wall and oppositely facing ball raceways along the side edges thereof;
    ball bearings disposed in adjacent raceways of the respective outer and inner slide members;
    an elongated rail housing having side and end walls defining a longitudinal barrel therein, wherein at least one wall thereof is provided with a longitudinal slot communicating with said barrel;
    a pair of supporting cradles arranged oppositely to each other and formed in said side walls thereof, whereby the respective outer walls are received in each of said cradles;
    a reinforcing bar member formed to be received and mounted within said inner slide member;
    a mounting bracket for attaching a load thereto, said bracket being secured to said slide mechanisms for movement therewith, and
    means for attaching said rail housing to a substantially fixed structure.

* * * * *